Dec. 4, 1962 R. VAN ANTWERP 3,066,941

REMOTELY CONTROLLED RECORD CHANGER

Filed Dec. 12, 1960 3 Sheets-Sheet 1

INVENTOR.
Robert Van Antwerp
BY Dawson, Jackson, Bettcher & Danner
Att'ys.

REMOTELY CONTROLLED RECORD CHANGER

Filed Dec. 12, 1960 3 Sheets-Sheet 2

INVENTOR.
Robert Van Antwerp
BY Brown, Jackson, Boettcher & Dienner
Att'ys.

Dec. 4, 1962 R. VAN ANTWERP 3,066,941

REMOTELY CONTROLLED RECORD CHANGER

Filed Dec. 12, 1960 3 Sheets-Sheet 3

INVENTOR.
Robert Van Antwerp
BY Brown, Jackson, Boettcher & Dienner

United States Patent Office 3,066,941 Patented Dec. 4, 1962

3,066,941

REMOTELY CONTROLLED RECORD CHANGER

Robert Van Antwerp, Benton Harbor, Mich., assignor to V-M Corporation, Benton Harbor, Mich., a corporation of Michigan Filed Dec. 12, 1960, Ser. No. 75,185
11 Claims. (Cl. 274—10)

This invention is directed to record changing apparatus, and more particularly to means for effecting control of at least one function of such apparatus from a location remote from the record changer itself.

In most automatic record changers, after a stack of records is placed thereon, and the speed control knob is rotated to select the desired turntable speed, the on-off-reject control knob can be displaced from the "off" through the "on" to the "reject" position, to initiate the operation of the record changer. In most conventional units the changer mechanism thereupon effects rotation of the turntable which in turn initiates a change cycle in which the bottom record is dropped from the stack onto the rotating turntable, and the tone arm is positioned on the record for the purpose of reproducing the intelligence from such record. The record changer thereafter effects the automatic play of each record in the stack, and the listener is free to leave the record changer location and occupy a position remote therefrom to listen to the program as the stack of records is automatically played.

If the user should operate the on-off-reject control knob to the "reject" position during the play of the stack of records the next record in the stack is advanced for play or, if the rejected record is the last (or only) record in the stack, automatic shut-off of the changer occurs. Because such knob is positioned on the record changer, it has been necessary for the listener in such instance to approach the record changer not only to energize the mechanism and initiate the playing of the successive records in the stack, but also to manually operate the control knob to the "reject" position each time a record is to be rejected.

One frequent and conventional use of record changer mechanisms incorporating such a control arrangement has been as a unit of a console model which further includes television and/or radio units, and a number of the more recent console models have been produced with remote control devices which permit the viewer or listener to turn the television and radio units on and off from a location remote from the console location. In the interest of providing a more complete range of remote control functions, it is manifestly desirable to also provide analogous remote control equipment for initiating the automatic playing of a stack of records, and in like fashion, enabling the reject of any record in the stack from a location remote from the console unit itself. Clearly it is also desirable to provide means for effecting remote control of a record changer unit when produced and mounted alone.

It is therefore a primary object of the present invention to provide a means for effecting a control function in a record changer apparatus responsive to receipt of a command transmitted from a point located remotely from the record changing apparatus.

Another object of prime importance is the provision of a linkage movable in a jam-proof manner, whether displaced by conventional manual selection means or the novel remotely controlled arrangement of the invention, to initiate a change cycle of the record changer mechanism.

It is a more specific object of the invention to effect the energization of the record changer mechanism and alternatively to effect the reject of a record played thereby from such remote point.

It is another object of the invention to provide means for storing energy prior to the issuance of the "energize" or "reject" command, and means for selectively releasing the energy to effect the desired operation responsive to receipt of such command.

It is an additional object of the invention to provide means, associated with conventional record changing means, for supplying energy to the storage means during the "down-hill" portion of the record changing cycle when the torque load for the record changing mechanism is at its minimum value.

In certain conventional types of record changer, the on-off-reject selector or control knob is positioned above the baseplate in a position readily accessible to the user, and manual rotation of this selector effects a related movement of an actuator means including a reject rod and a cotnrol shaft assembly beneath the baseplate to operate control means such as a trip link and initiate a change cycle by the record changing mechnaism in a manner well known and understood by those skilled in the art. In accordance with the inventive teaching, the record changer is modified by the addition of auxiliary control means which is operative responsive to receipt of a command signal from remotely located signal means to effect displacement of the actuator means including the reject rod, thus energizing the record changer mechanism and/or initiating a change cycle.

Such auxiliary control means in one embodiment includes an actuator lever having a trip arm for engaging a stud on the reject rod when the actuator lever is itself displaced. The actuator lever is initially cocked or displaced from a restored position to a stored-energy position and a bias spring connected to a cocking arm of the actuator lever is extended and placed under tension with such movement. A trip latch is operative to hold or lock the actuator lever in the stored-energy position when displaced thereto. When the trip latch is released, the bias spring swiftly urges the actuator lever toward the restored position, and the trip arm of such actuator lever engages the stud on the reject rod to displace the rod and effect the desired function.

The actuator lever can be displaced from its restored position to its stored-energy position by a cocking lever. Such cocking lever may be included on the slide assembly of the conventional changer apparatus and mounted so that the usual angular rotation of the main gear during the change cycle moves a pin mounted eccentrically on the main gear to engage and displace the cocking lever. If the actuator lever is in the restored position, the cocking lever engages the cocking arm of the actuator lever and moves the actuator lever to the stored-energy position.

According to a novel concept of the invention, the cocking of the actuator lever is accomplished during the last half or the down-hill part of the change cycle when the load on the record changer mechanism is at a minimum. Such operation is of considerable importance, because prior to this time in the change cycle there is a considerable torque load on the main gear of the mechanism as the various record-changing operations are performed. These operations include the movement of the tone arm above the baseplate and outwardly beyond the periphery of the widest-diameter record that can be dropped, and the displacement of the actuator lever in the spindle mechanism. Thus, if the actuator lever were cocked during the first half of the change cycle, a more powerful motor would be required to do this extra work. By effecting the energy storage during the latter part of the change cycle, when there is substantially no torque load on the main gear, the energy is readily provided for subsequent release to effect a desired control action without the requirement of providing a more powerful motor.

When the reject operation is to be accomplished, the trip latch can be positively operated by a simple electrically responsive device, such as an electromagnet, so that the energy stored in the bias spring is released swifty for positive and certain operation of the actuator lever or lever means.

The features of the present invention which are believed to be novel are set forth with particularity in the appended claims. The invention itself, together with further objects and advantages thereof, may best be understood by reference to the following description taken in connection with the accompanying drawings, in the several figures of which like reference numerals identify like elements, and in which:

*Introduction*

Figure 5:
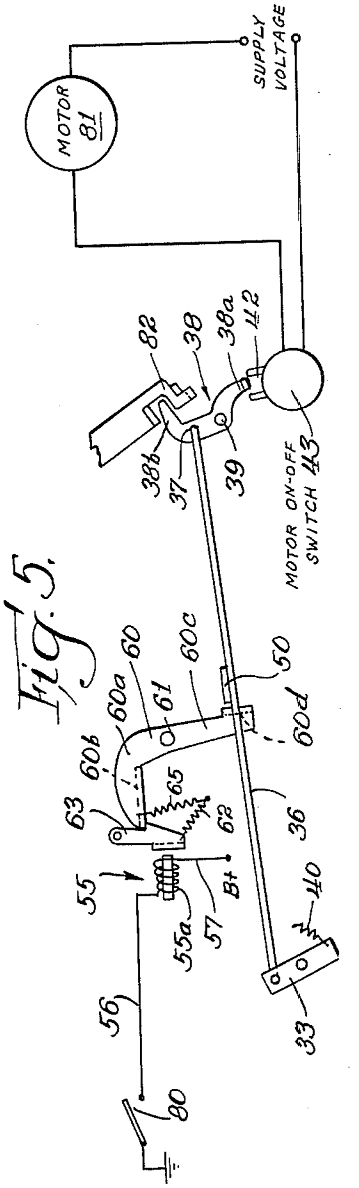
FIGURE 5 is a simplified operating diagram, partly in schematic form, depicting the cooperation between certain of the electrical and mechanical portions of the inventive apparatus.

To orient the reader with respect to the incorporation and operation of the novel control structure in a record changer, certain salient elements of the invention are shown in their relation to conventional record changer elements in FIGURE 5. It is initially noted that the simplified showing of FIGURE 5 depicts such elements looking downwardly toward the record changer, with the baseplate and turntable removed. Accordingly, it will be understood that such elements are reversed in the illustration of FIGURE 1, which is a view from the bottom of the record changer apparatus.

When the listener effects angular rotation of the manually operable on-off-reject selector means from the "off" to the "on" position, control plate 33 pivots about shaft 34 to effect the movement of reject rod 36 from left to right in FIGURE 5, and control shaft assembly 38 is rotated in the clockwise direction around pivot shaft 39 to displace yoke actuator 42 to turn the on-off switch 43 to the "on" position and energize turntable motor 81. Reject rod 36 and control shaft assembly 38 can be considered a single actuator means for translating movement in the initiation of a change cycle.

A further rotation of the knob effects an additional displacement of such actuator means, arm 38*b* of the control shaft assembly engaging the extremity of trip link 82, which in turn displaces a trip lever which pivots and effects a corresponding pivotal movement of a pawl lever (not shown). In accordance with conventional practice the pawl lever carries the trip pawl toward the turntable hub to engage a projection thereon, giving a push which causes the teeth in the main gear to engage the teeth in the turntable hub, to drive the main gear through 360° and effect a complete change cycle. For purposes of this description and the appended claims, the trip link, trip lever, pawl lever, and trip pawl will together be considered a control means effective when actuated (e.g., by displacement of trip link 82) to initiate a change cycle of the record changer mechanism. The trip lever, pawl lever, trip pawl and turntable hub with teeth thereon are not illustrated, being conventional and well-known elements.

In accordance with the inventive teaching, an actuator lever 60 is pivotally journalled about shaft 61, and a flange element 60*d* of this lever is located to engage and move with a stud 50 on reject rod 36 under certain conditions, as will be explained hereinafter. A bias spring 65 connected between a cocking arm of lever 60 and a fixed reference point urges actuator lever 60 in the counterclockwise direction (as viewed in FIGURE 5). Bias spring 65 is placed under tension as actuator lever 60 is rotated in the clockwise direction to the position shown in FIGURE 5, such position being referred to hereinafter as the "cocked" or "stored-energy" position.

A trip latch 63 has a shoulder portion which is disposed adjacent the stored-energy position of actuator lever 60, and as lever 60 approaches such position a spring 62 exerts a force on latch 63 to urge the shoulder portion thereof into a latching position for the actuator lever. It will be appreciated that latch 63 maintains actuator lever 60 in the stored-energy or cocked position notwithstanding displacement of reject rod 36 by rotation of the on-off-reject control knob through the "on" to the "reject" position, and the return of reject rod 36 from the "reject" to the "on" position under the urging of bias spring 40.

An electromagnet 55 including a winding 55*a* is disposed adjacent a cooperating arm portion of trip latch 63. A control circuit including a remotely positioned control switch 80 is connected to energize the control winding 55*a* to draw trip latch 63 toward the electromagnet and withdraw the shoulder portion thereof from latching contact with the arm of actuator lever 60. With such operation, the energy stored in bias spring 65 is immediately expended in rotating actuator lever 60 in the counterclockwise direction. If the control knob is in either the "off" or "on" position, flange 60*d* engages and displaces stud 50 to move reject rod 36 to the "reject" position (from left to right as shown in the drawing), to thereby initiate a change cycle.

As will be explained hereinafter, during each successive change cycle a cocking mechanism including lever 66 incorporated in the record changer mechanism will cock actuator lever 60 whenever there is no energy then stored in spring 65 and actuator lever 60 is in the restored position. This cocking is effected during the last half or "down-hill" portion of the change cycle, when the load on the record changing mechanism is at a minimum.

*Detailed Description*

The manner in which the novel remotely controlled on-off-reject mechanism is incorporated in one form of record changer will now be described. Basically the record changer includes a baseplate which serves as a support member for the other elements including a turntable pivotally mounted for rotation about its center, a spindle, a tone arm and a record support, all conventionally positioned above the baseplate for actuation by the turntable drive assembly and the record changing mechanism which is basically disposed below the baseplate. The turntable drive assembly includes a shaft extending upwardly through a suitably apertured portion of the baseplate with an idler wheel mounted on the shaft to engage and drive the turned-down rim of the turntable, thus to rotate the turntable and effect a corresponding rotation of the turntable hub. The lower portion of the hub has an integral gear formed thereon, and as the turntable hub gear is rotated with the turntable, selective engagement of the toothed portion of a main gear in the record changing mechanism with the turntable hub gear provides a driving connection over which power is supplied to the record changing mechanism during a change cycle. As will become evident, the novel structure of the invention can be added to such existing record changers and can be readily incorporated in newly-produced mechanisms.

Figure 1:
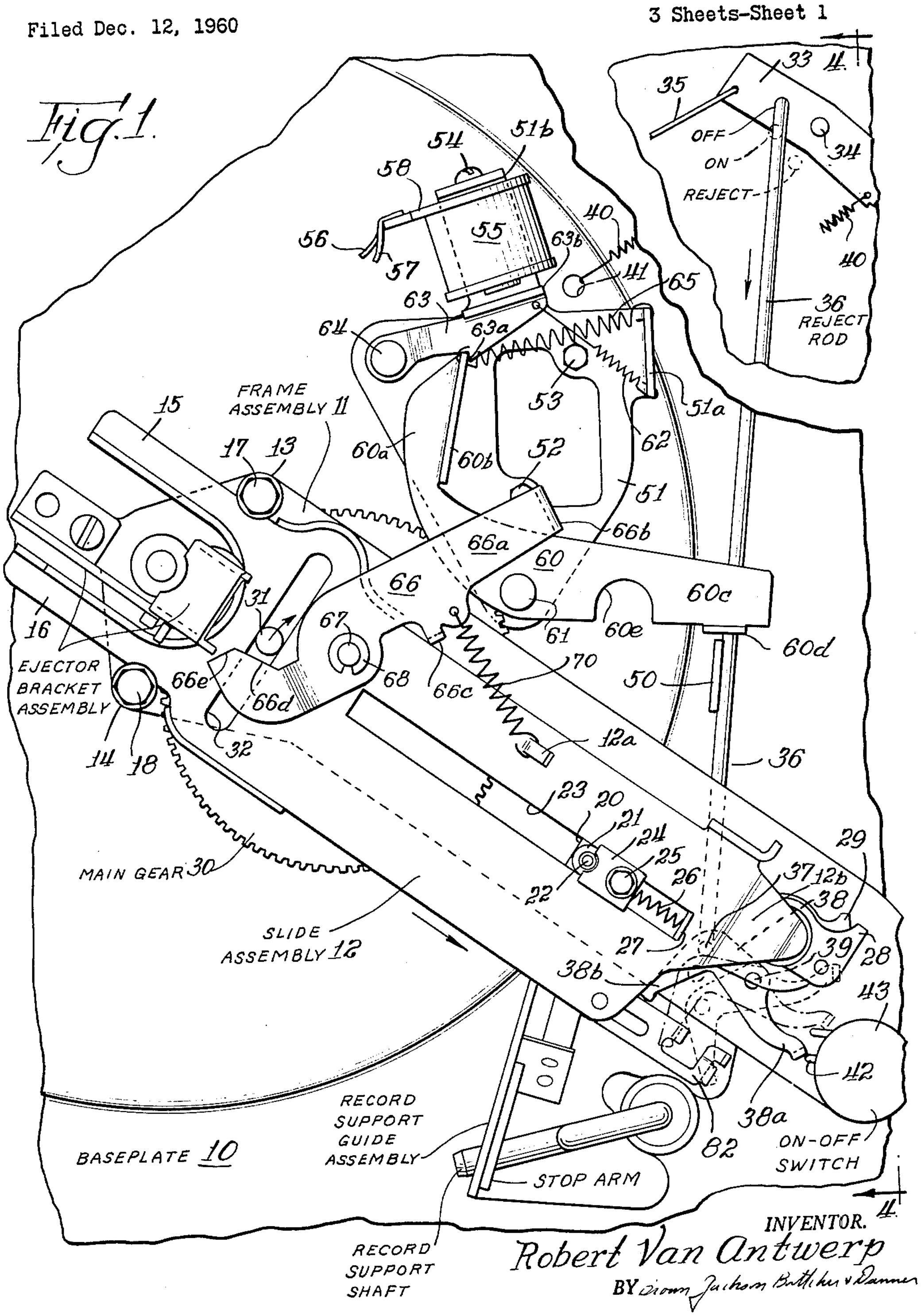
FIGURE 1 is a bottom view of a portion of an automatic record changer modified in accordance with the inventive teaching.
Figure 2:
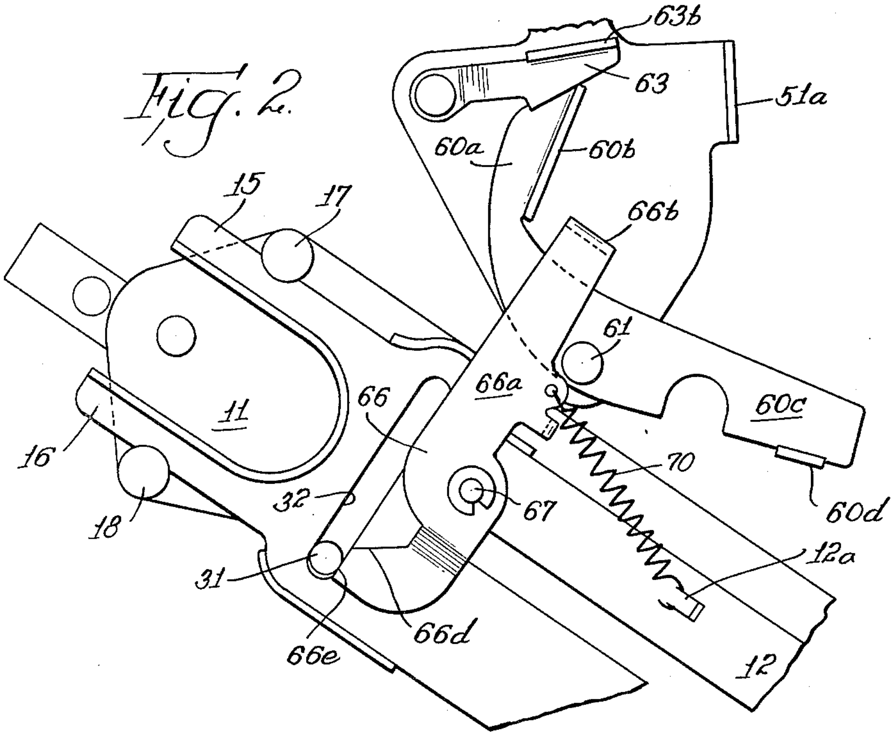
FIGURES 2 and 3 are partial bottom views, illustrating certain of the elements depicted in FIGURE 1 as their positions are changed during a record changing cycle.

As shown in FIGURE 1, looking from a point below the record changer unit upwardly toward the support member or baseplate 10, the salient elements of the record changing mechanism are there illustrated. Specifically, a frame assembly 11 for supporting the operating elements of the record changer mechanism is affixed to baseplate 10 by suitable fastening means (not shown). The operating elements supported by such frame assembly include a slide assembly 12 having a tongue 12*b* at one end thereof, a central guide slot 23, a transverse or cross drive slot 32 positioned substantially normal to the guide slot, and a bifurcated end portion having forked extensions 15 and 16. Frame assembly 11 includes a pair of guide pillars 13 and 14 which extend upwardly (i.e., away from the frame assembly or toward the viewer in FIG. 1), and each of the guide pillars includes a cut-away shoulder section (not visible) for receiving projections 15 and 16 at the bifurcated end portion of the slide assembly. A pair of washer-head screws 17 and 18 are respectively threaded into correspondingly tapped portions in the guide pillars, and the heads of the screws extend over projections 15 and 16 to provide effective guide channels for the bifurcated end portion of the slide assembly.

The slide assembly is also supported and guided near its opposite extremity by a supporting post 20, which includes an upwardly extending guide cylinder 21 terminating in a cylindrical projection 22. The guide cylinder 21 has an outer diameter only slightly less than the width of guide slot 23 in slide assembly 12 to reference or guide the slide in its longitudinal reciprocation during a change cycle. A cover plate 24 extends over the edges of slot 23, and is fastened to post 20 by a screw 25. A bias spring 26 extends between cover plate 24 and an upwardly struck tab 27 at the end of slot 23, to urge pin 31 into its at-rest position at the end of each change cycle. Thus, having three main points of support and indexing as described, the slide assembly is positioned above frame assembly 11 and referenced to permit longitudinal reciprocation of the slide along an axis generally coincident with the center of guide slot 23.

The record changer mechanism further includes a main gear 30 which drives the slide assembly, and is mounted between frame assembly 11 and slide assembly 12. Gear 30 is pivoted about a shaft fixed in a pillar (not visible) of frame 11 and a pin 31, eccentrically mounted on gear 30, extends upwardly from such gear through transverse drive slot 32 in slide assembly 12. Accordingly, rotation of main gear 30 and concomitant angular displacement of eccentric pin 31 is translated into rectilinear movement of slide 12 by reason of the engagement of pin 31 in transverse slot 32 of the slide.

Teeth are located along the outer periphery of main gear 30 except for a short recessed portion normally positioned adjacent the gear teeth on the turntable hub. Accordingly, as the turntable is driven in conventional fashion over the driving connection with the idler wheel, the smooth recessed section of main gear 30 is maintained adjacent the gear on the turntable hub, and the record changing mechanism is idle. It is only at the initiation of a change cycle by the velocity trip mechanism as the tone arm is accelerated toward the center of a record (or by manual operation of the control knob) that the teeth on main gear 30 adjacent such recessed portion are kicked into engagement with the gear teeth on the turntable hub to drive main gear 30 through a complete revolution and thereby effect the reciprocation of the slide assembly and the various operations in the record-changing cycle.

During each record-changing cycle various control operations are effected, such as the raising of the tone arm, rotating the tone arm outwardly to clear the largest-diameter record that can be dropped to the turntable, displacing the actuator in the spindle mechanism to drop the next record onto the turntable or onto the stack of records positioned thereon, returning the tone arm inwardly toward the proper position for set-down on the rim area of the next record to be played, and downward movement of the tone arm to effect such engagement of the needle on the rim portion of the record. Translation of the rectilinear movement of the slide assembly into the various motions required to perform such functions are well known and understood in the art, and are explained for example in the Service Manual and Parts List for V-M Model 1201 Stereo Record Changer, published by the V-M Corporation of Benton Harbor, Michigan, and such descriptions are also available in the conventional technical and servicing bulletins such as the Photofact Folder Set 436, Folder 18. Accordingly the engagement of the slide assembly with such elements during the change cycle is not described herein.

Figure 4:
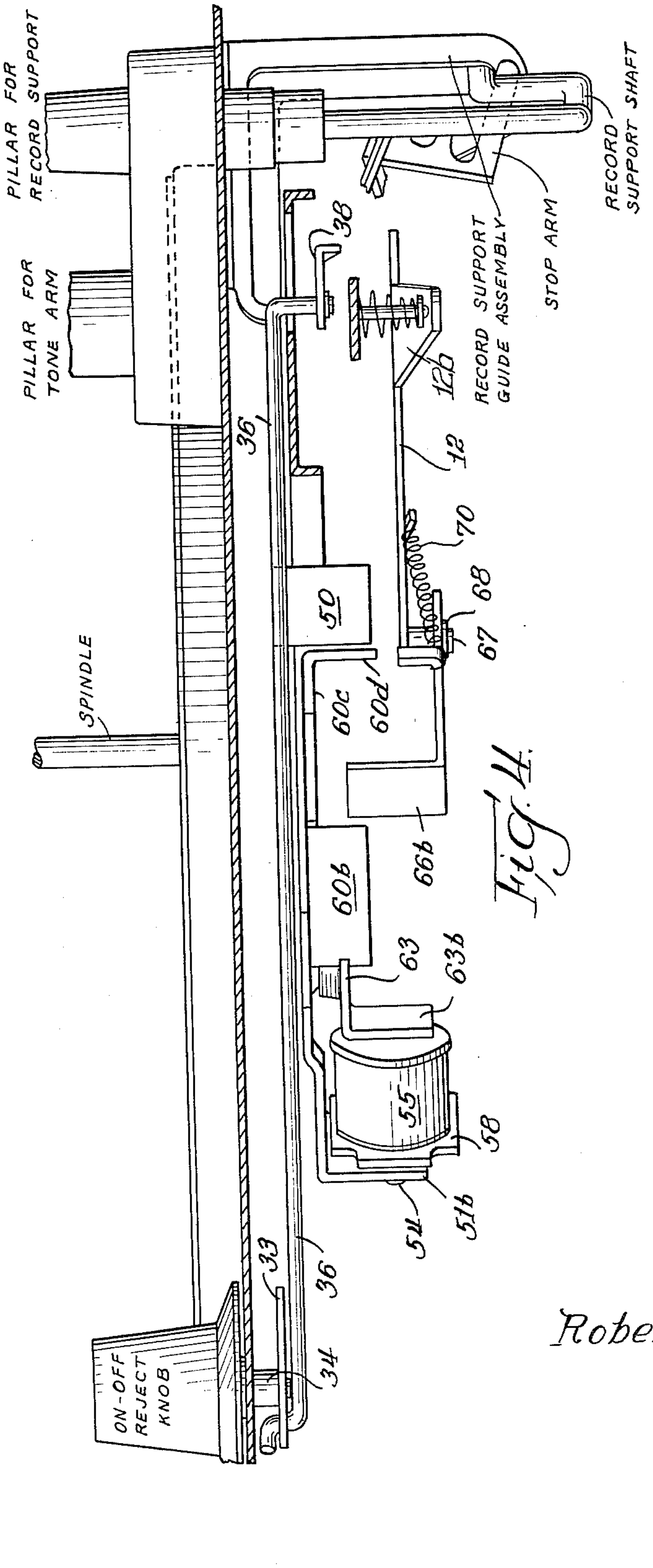
FIGURE 4 is a side view taken along the line 4—4 in FIGURE 1.

As indicated above the record changer unit may be selectively operated by rotating the control knob located on the upper side of base plate 10 to different control positions. As shown in FIGURE 4, the control knob is connected to one end of shaft 34 which extends through the base plate to a control plate 33, rotation of the control knob effecting the concomitant angular displacement of control plate 33. A bias spring 40 (FIG. 1), conventionally designated the reject spring, has one end thereof connected to control plate 33 at the side of control shaft 34 opposite that to which reject rod 36 is connected, and the other end of bias spring 40 is connected to an aperture 41 in baseplate 10. With movement of the control knob from the "off" to the "reject" position, or from the "on" to the "reject" position and the release thereof, bias spring 40 returns the control plate 33 to the "on" position.

Control plate 33 operatively controls a retraction rod 35 and the reject rod 36. Retraction rod 35 has one end connected to control plate 33 and the opposite end coupled to the idler wheel assembly (not shown) of the turntable drive means to insure that the idler wheel is withdrawn from contact with the turntable when the mechanism is shut off, thereby preventing flattening of the idler wheel when the changer is de-energized for a long interval. Reject rod 36 has one end bent to extend through control plate 33, as shown in FIGURE 4, and its opposite end bent at right angles to extend through an aperture 37 (FIGURE 1) in control shaft assembly 38. Control shaft assembly 38 comprises a power switch actuating arm 38*a* and a trip link actuating arm 38*b* which are pivotally supported by shaft 39 secured in frame assembly 11.

As the on-off-reject control knob is rotated from the "off" to the "on" position to effect a corresponding rotation of control plate 33, the end of reject rod 36 connected thereto is displaced, and control shaft assembly 38 is caused to pivot around shaft 39. With this action, arm 38*a* is moved from the solid line to the broken line position and displaces U-shaped yoke actuator 42 of on-off switch 43 to complete the energizing circuit for the turntable drive motor 81 as described above, and arm 38*b* is also displaced from the solid line to the broken line position, but is not effective to engage the end of trip link 82 to start a change cycle when control shaft assembly 38 is rotated to the "on" position.

As the on-off-reject control knob is further rotated from the "on" to the "reject" position, control plate 33 is further rotated, displacing reject rod 36 to effect an additional rotation of control shaft assembly 38 about shaft 39. Arm 38*a* does not perform any additional control function as it is rotated from the broken line to the dotted line position, but the corresponding rotation of arm 38*b* causes it to engage and displace the end of trip link 82 to initiate a change cycle. Subsequent change cycles can be initiated in the same manner by manual rotation of the control knob, by displacement of the trip finger cam when the needle enters the trip grooves at the center of a record, or by actuation of the auxiliary control means of the invention as described hereinafter.

*Structure of the Invention*

From the foregoing explanation, it is evident that displacement of reject rod 36 substantially linearly in the direction indicated by the arrow effects the required angular displacement of control shaft assembly 38 to start a change cycle of the record changer apparatus. In accordance with the inventive teaching, apparatus is provided for storing energy which, when released, effects the requisite linear displacement of reject rod 36 to energize the drive motor and/or initiate a change cycle to reject the record then playing (or drop the first record onto the turntable). More specifically, as shown in FIGURE 1, such storage means includes a mounting plate 51 secured to the baseplate, the mounting plate including a bent-up flange portion 51*a* for securing the ends of certain spring elements, to be described hereinafter, and another bent-up flange portion 51*b* through which a mounting screw 54 is passed to secure an electromagnet 55 in the position shown.

An actuator lever 60 is pivoted near its central portion for rotation about a shaft 61, which is fastened to and supported by mounting plate 51. Lever 60 includes a cocking arm 60*a* having a flange portion 60*b* thereon, a trip arm 60*c* having a flange or hammer 60*d* formed thereon for engagement with a stud 50 affixed to the reject rod when actuator lever 60 is rotated in the clockwise direction about shaft 61, and a generally semi-circular cut-out 60*e* in arm 60*c* to facilitate passage of the leads from the cartridge at the end of the tone arm, if desired. Screws 52 and 53 pass through baseplate 10 to secure mounting plate 51 to the baseplate.

A bias spring 65 is connected between flange 51*a* of the mounting plate and the end of cocking arm 60*a* of the actuator lever to urge actuator lever 60 in the clockwise direction about pivot shaft 61.

A trip latch 63 for actuator lever 60 is pivotally mounted about a shaft 64, which extends into and is supported by mounting plate 51. A bias spring 62 is connected between flange 51*a* of mounting plate 51 and one end of trip latch 63 to normally urge the trip latch in the clockwise direction. The trip latch includes a shoulder portion 63*a*, shown engaging the extremity of cocking arm 60*a* when actuator lever 60 is in its extreme counterclockwise position. The trip latch also comprises an upright flange or arm portion 63*b*, disposed adjacent electromagnet 55 to be attracted thereby when an energizing impulse is applied to the electromagnet winding. The application of such an energizing impulse effects a counterclockwise movement of trip latch 63 about its pivot shaft 64, pulling shoulder 63*a* back from the extremity of cocking arm 60*a* and permitting actuator lever 60 to rotate rapidly in the clockwise direction about shaft 61 under the urging of bias spring 65.

The invention further comprises power take-off means including lever means for cocking actuator lever 60. That is, a cocking lever 66 is journalled about the upper portion of a shaft 67 which is affixed to and supported by slide assembly 12. A C-washer 68 secures lever 66 on shaft 67. Lever 66 includes a cocking arm 66*a* having a downwardly depending flange portion 66*b* for engaging flange 60*b* of the actuator lever, a stop lug 66*c* struck downwardly to engage the side of slide assembly 12 and thus prevent rotation of the cocking lever in the clockwise direction under the urging of bias spring 70 beyond the extent shown, and another arm which includes a sloping or angled portion 66*d* and an end surface 66*e* adjacent the sloping portion. Cocking lever 66 is operated during the reciprocation of slide assembly 12, the lever being rotated about shaft 67 in a cocking motion to be explained hereinafter.

Sloping or angled portion 66*d* and end portion 66*e* are positioned for engagement by eccentric pin 31 as main gear 30 is displaced through a portion of a change cycle, thus to effect a counterclockwise rotation of cocking lever 66 which is effective to displace actuator lever 60 into the stored-energy position (provided it is not already in such position) shown in the drawing, thereby storing energy in spring 65 which upon release is effective to restore lever 60 and displace reject rod 36, a control action which can be utilized to energize the turntable drive motor and/or initiate the driving of the record changer apparatus through one complete change cycle.

*Operation of the Invention*

Actuator lever 60 can be displaced into the cocked or stored-energy position by engagement with cocking lever 66 during a change cycle of the record changer, if the actuator lever is in the restored position at the start of the cycle. As described hereinbefore, slide assembly 12 is displaced in a linear direction downward and to the right as shown by the arrow in FIGURE 1, and then returned in the opposite direction to the illustrated position as main gear 30 completes its full cycle of rotation. During the first 90° of such rotation, pin 31 is displaced upwardly and to the right to one extremity of drive slot 32, and in the next 180° of rotation of gear 30, pin 31 is displaced through the length of slot 32 to the opposite extremity of the slot. During the last 90° of rotation of main gear 30, pin 31 is returned to the position illustrated. Accordingly, from the relative positions of eccentric pin 31 and ramp portion 66*d* of cocking lever 66, it is manifest that main gear 30 is driven through slightly more than 180° of rotation in the change cycle before the eccentric pin engages ramp portion 66*d* and begins to rotate cocking lever 66 in the counterclockwise direction about shaft 67 to move lever 60 to the cocked position.

As the last half (or down-hill portion) of the change cycle commences, slide assembly 12 starts its return from its extremity of displacement to the position illustrated in FIGURE 1. At this time the torque load on the changer mechanism is at a minimum, and flange 66*b* of cocking arm 66*a* is still considerably distant from flange 60*b* of the actuator lever. As slide 12 continues its return movement, pin 31 is displaced in drive slot 32 toward the lower left extremity thereof (FIGURE 1) and engages sloping portion 66*d*, and portion 66*d* rides along the pin to rotate lever 66 through approximately 30° in the counterclockwise direction against the restraining force of bias spring 70, until pin 31 traverses the length of sloping portion 66*d* and abuts end portion 66*e* of the cocking lever. At this time cocking lever 66 is nearing the proper position for engagement with flange 60*b* of actuator lever 60.

Figure 3:
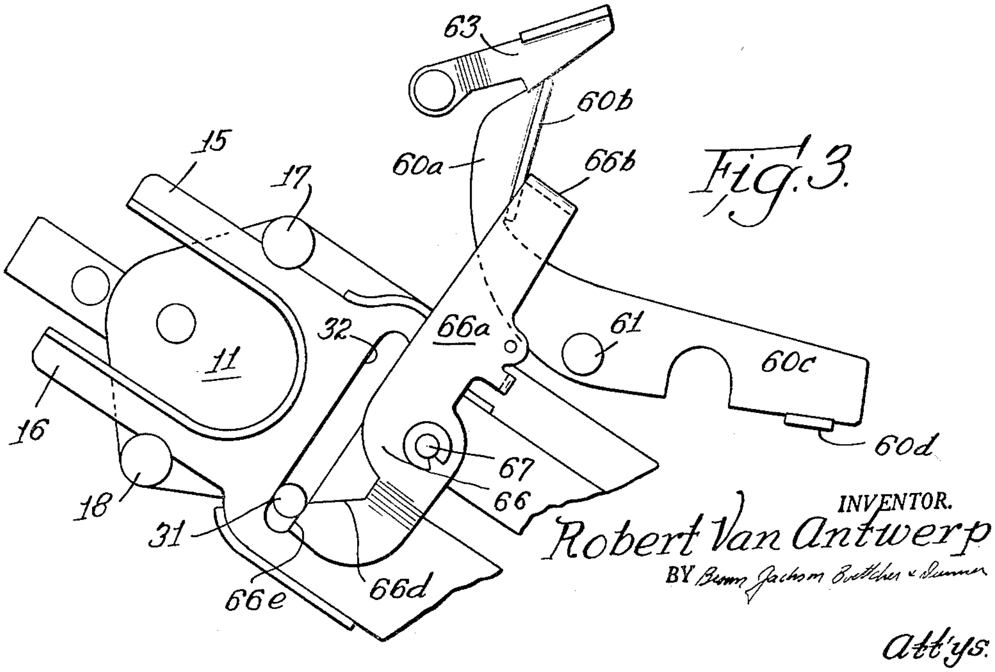

As main gear 30 continues to rotate in the clockwise direction and slide assembly 12 continues its return movement toward the at-rest position shown in FIGURE 1, eccentric pin 31 commences to return from the extremity of slot 32 toward the mid-point thereof as shown in FIGURE 3. At this time, pin 31 is still engaging end portion 66*e* of cocking lever 66 as flange 66*b* at the opposite end of the cocking lever engages up-turned flange 60*b* of the actuator lever, and commences the counterclockwise rotation of actuator lever 60 to the cocked or stored-energy position. This movement of slide 12 and cocking lever 66 continues, and lever 60 is rotated in the counterclockwise direction until shoulder 63*a* of trip latch 63 engages the extremity of flange 60*b* of the actuator lever. Accordingly the mechanism is now cocked and energy is stored in spring 65 for subsequent release to effect a control operation responsive to energization of electromagnet 55. As main gear 30 continues to rotate to complete a full cycle, slide assembly 12 is returned to the position shown in FIGURE 1. Cocking lever 66 is also returned to the position there shown under the urging of bias spring 70 as pin 31 rides down ramp portion 66*d*, the clockwise movement of lever 66 being halted as tab 66*c* engages the side of slide assembly 12.

It is emphasized that the stored energy is provided in bias spring 65 during the "down-hill" or return movement portion of the change cycle, after the principal steps or work in the record changing sequence have been effected and the torque load on the mechanism is at a minimum. Specifically, the tone arm has been moved upwardly and outwardly of the turntable, the actuator in the spindle has been displaced to drop the next record to the turntable (or to the top record on the turntable stack), and the principal functions remaining to be accomplished by the changer mechanism are returned and set down of the tone arm. Thus the mechanism will be ready to respond instantly to a command even as the needle enters the first groove of the record, should the listener decide to immediately terminate the playing of that specific record.

After the energy is stored in spring 65 by displacement of cocking lever 66 as described above during the change cycle, the command for start or reject is supplied to the mechanism by energization of electromagnet 55. When the electromagnet winding is energized, upturned flange 63*b* of trip latch 63 is drawn momentarily toward the electromagnet, and shoulder 63*a* is pulled away from and releases arm 60*a* of the actuator lever. Accordingly, the energy stored in bias spring 65 effects a quick and positive clockwise displacement of actuator lever 60 about shaft 61, causing flange 60*d* to engage stud 50 affixed to reject rod 36, in turn effecting a substantially linear displacement of the reject rod to initiate operation of the record changer or to reject a record during operation by initiating a change cycle. Reject rod 36 is returned from the "reject" to the "on" position by spring 40 after the change cycle has been commenced by manual rotation of the on-off-reject control knob, and spring 40 performs the same function when a change cycle is initiated by the novel remote control arrangement of the invention, after cocking lever 66 returns actuator lever 60 to the stored-energy position and withdraws flange 60*d* from engagement with stud 50 on the reject rod. The relative positions and displacements of the various elements will be better understood after referring to FIGURE 4, from which flange 51*a* of mounting plate 51 has been omitted to facilitate the illustration of the various cooperating elements.

*Summary*

It will be apparent from the foregoing description that the novel structure must be, and is, capable of operating reliably whether actuated by the remote control means or by the manual control device provided in the unit. In brief summary, assuming initially that the control knob is in the "off" position, energy is stored in the novel auxiliary control means of the invention (i.e., actuator lever 60 is cocked and held by trip latch 63 against the urging of bias spring 65). Such energy storage is effected by the record changer mechanism as it is driven through the last change cycle when shutting off. It is important to note that movement of the novel auxiliary control means is such that manual rotation of the control knob to the "off" position will never "jam" the remote control means, and any operation of the remote control means, whether before, during, or after a manual operation of the control knob, can also be effected without damaging the unit.

Assuming that the record player is to be operated by the remote control means, a command impulse is transmitted from a remote location to release the stored energy in displacing the actuator lever to initiate a change cycle of the equipment. As the record changer is driven through such change cycle, the actuator lever is automatically re-cocked as energy is again stored in spring 65 to provide for a successive operation.

Alternatively, the record player can be initially started by manual displacement of the control knob from the "off" position through the "on" position to the "reject" position to initiate a change cycle. Since the control knob was in the "off" position prior to displacement thereof, the auxiliary control means must have been previously cocked as noted above, and the auxiliary control means remains in the cocked or stored-energy position through such cycle. The movement of the control knob in such manner can be accomplished without fear of damage to the mechanism, regardless of the position of the auxiliary control mechanism at such time.

During normal operation of the record changer, the records will be successively played and a change cycle will be initiated by the velocity trip mechanism as the record arm is accelerated in the high speed grooves toward the record center, and this operation does not affect either the position of the on-off-reject control knob or the auxiliary control means, which retains the energy stored therein for a subsequent operation. Any record can be rejected by manual rotation of the control knob from the "on" to the "reject" position to initiate a change cycle. If the manual control knob is utilized to initiate the change cycle, the linkage is such that the manual knob may be freely moved without damage to the storage means which remains cocked during the cycle. Alternatively, by operation of the command means at the remote location to release the energy stored in the auxiliary control means and thereby initiate a change cycle, the auxiliary control means displaces the control knob to the "reject" position to cycle the changer mechanism, and the changer mechanism in effecting a change cycle automatically re-cocks the storage means during the down-hill portion of the record change cycle. Such operation of the respective control devices can be effected without danger of jamming or damaging any elements of the equipment.

When the last record is dropped to the top of the stack, the stop arm is displaced and initiates the sequence of operations which, through the next cycle of the record changer mechanism, shuts off the changer with the auxiliary control means still in the cocked position. The record changer may also be de-energized manually, by moving the control knob from the "on" to the "off" position, the linkage being such as to permit the movement of the control knob without operation of the auxiliary control means which remains in the cocked position.

It is further noted that the remote control means can be safely operated at any time during the change cycle without fear of locking or damage. Thus if a control pulse is transmitted from a remote location during the first half of a change cycle, the auxiliary control means operates to release the trip latch and actuator lever 60 rotates to displace the reject rod to attempt the control operation which would initiate a change cycle if the cycle had not already been commenced. However, because the linkage is jam-proof, such operation does not interfere with the record changing mechanism, which continues its normal operation. Should the energy stored in the auxiliary control means be released during the latter portion of the change cycle, there is similarly no action produced which can jam or retard the record changing mechanism in the positive and certain completion of the change cycle.

It is apparent from the foregoing description that a record changer including the novel remote control means may be safely controlled either manually or remotely, without danger of damage to the equipment. Such feature constitutes a basic aspect of the invention. Thus it is evident that the invention provides a simple and positive arrangement for starting a record changer or rejecting a record from a location remote from that of the record changer apparatus. The listener is accordingly permitted to enjoy the reproduced intelligence without the necessity of a trip to the record changer each time one of the records is rejected. Energy can be automatically stored as the mechanism which effects the record changing cycle is driven through the last half or down-hill part of the cycle. In the down-hill portion of the change cycle, there is minimum demand upon the cycling equipment for other operations, and thus the energy can be readily stored in a bias spring for subsequent use during the reject operation. The inventive mechanism is simple and economical to fabricate, and is positively operated responsive to a simple command such as actuation of an electromagnet. The electromagnet can be operated in any of a number of conventional ways. For example, a control switch can be positioned at the listening location, and connected over an extension cord to the electromagnet. Alternatively, a system for propagating a signal of a frequency above the range of human audibility can be used; such a signal is sent from a remote location, detected at the changer to provide a control impulse, and the impulse is then applied to the electromagnet. If the last record of a stack has already fallen to the turntable (or to the top of the turntable stack), the stop arm will have been displaced by the downward movement of the record support shaft in a well-known manner and the reject operation will effect shut-off of the record changer apparatus. Thus the advantages inherent in the invention are manifest and desirable.

Although only a particular embodiment of the invention has been shown and described, it is apparent that modifications and alterations may be made therein, and it is intended in the appended claims to cover all such modifications and alterations as may fall within the true spirit and scope of the invention.

What is claimed is:

1. In an automatic record changer having a record changer mechanism operable in a cyclic manner including control means for initiating a cycle of said record changer mechanism, actuator means including a reject rod for operating said control means, and manually operable means for selectively operating said actuator means and said reject rod, the improvement which comprises: auxiliary control means including an electrically responsive device, lever means operatively controlled by said electrically responsive device to move into engagement with and operate said reject rod in a motion to operate said control means, and remotely-controlled means connected to selectively energize said electrically responsive device and thereby initiate a cycle of said record changer mechanism.

2. In an automatic record changer having a record changer mechanism operable in a cyclic manner including control means for initiating a cycle of said changer mechanism, manually operable selector means operable to off, on, and reject positions, and actuator means coupled to said selector means operative as said selector means is moved to the reject position to effect operation of said control means in the initiation of a cycle of said record changer mechanism, the improvement which comprises: auxiliary control means including a movable member operable from a first position to a second position to effect displacement of said manually operable selector means and said actuator means from the off and on positions to the reject position to thus effect operation of said control means and initiation of a cycle of said record changer mechanism, and remotely controlled means including means operative to selectively actuate said movable member to initiate a cycle of the record changer mechanism.

3. In an automatic record changer having a record changer mechanism operable in a cyclic manner to terminate the playing of one record and to effect the positioning of a further record for play including control means for initiating a cycle of the record changer mechanism, and actuator means including a reject rod connected to said control means operative in a predetermined movement to actuate said control means, the improvement which comprises: auxiliary control means including an electrically-responsive coil means, lever means supported to move through a predetermined path responsive to energization of said electrically responsive coil means, means on said lever means disposed to engage said reject rod subsequent to its initial movement and to displace same in its continued movement to operate said control means, and remotely-controlled means connected to selectively energize said electrically responsive coil means.

4. In an automatic record changer having a record changer mechanism operable in a cyclic manner including trip means for initiating a cycle of said record changer mechanism, actuator means including a reject rod and a control assembly for operating said trip means, and a manually operable control knob for selectively operating said reject rod and control assembly, the improvement which comprises: auxiliary control means including an actuator lever displaceable to engage said reject rod, an electrically responsive device, means operatively controlled by said electrically-responsive device to displace said actuator lever into engagement with and the displacement of said reject rod, and remotely-controlled means connected to selectively energize said electrically responsive device and thereby displace the actuator lever to operate the reject rod and initiate a cycle of said record changer mechanism.

5. In an automatic record changer having a record changer mechanism operable in a cyclic manner including control means for initiating a cycle of said record changer mechanism, actuator means for operating said control means, and manually operable means for selectively operating said actuator means, the improvement which comprises: auxiliary control means including energy storage means connected to operate said actuator means in the release of its energy, means on said record changer mechanism operative to couple energy to said energy storage means during the last half of each change cycle, an electrically responsive device, means operatively controlled by said electrically responsive device to release the energy from said energy storage means, and remotely-controlled means connected to selectively energize said electrically responsive device and thereby release the stored energy to operate said actuator means in the initiation of a cycle of said record changer mechanism.

6. In an automatic record changer having a record changer mechanism operable in a cyclic manner including control means for initiating a cycle of said changer mechanism, manually operable selector means operable to off, on, and reject positions, and actuator means coupled to said selector means operative as said selector means is moved to the reject position to effect operation of said control means in the initiation of a cycle of said record changer mechanism, the improvement which comprises: auxiliary control means including lever means operable from a first position to a second position and means controlled by said lever means in said operation to displace said actuator and selector means alternatively from the on position to the reject position to thus effect operation of said control means and the initiation of a cycle of said record changer mechanism, energy storage means connected to operate said lever means from said first position to said second position, power take-off means connected to said record changer mechanism to couple energy to said energy storage means during the last half of each cycle including means for returning said lever means from said second position to said first position for use in a subsequent operation of said control means, and remotely controlled means including means for selectively releasing the power of said energy storage means to initiate a cycle of the record changer mechanism.

7. In an automatic record changer having a record changer mechanism operable in a cyclic manner including trip means for initiating a cycle of said record changer mechanism, a drive gear operable through one revolution in each cycle of the record changer mechanism, a pin mounted on said gear for movement along a predetermined eccentric path during each revolution, and actuator means for operating said trip means to initiate a cycle of said record changer mechanism, the improvement which comprises: auxiliary control means including an actuator lever mounted for operation along a predetermined path to operate said actuator means, energy storage means coupled to said actuator lever to displace the actuator lever along said predetermined path in the release of its energy, power take-off means including lever means controlled by said pin in its eccentric movement operative to couple energy to said storage means during each change cycle, an electrically responsive device, trip means operatively controlled by said electrically responsive device to release the energy stored in said energy storage means, and remotely-controlled means connected to selectively energize said electrically responsive device to release the stored energy and thereby displace the actuator lever to initiate a cycle of said record changer mechanism.

8. In an automatic record changer having a record changer mechanism operable in a cyclic manner including trip means for initiating a cycle of said record changer mechanism, actuator means for operating said trip means, and a manually operable control knob for selectively operating said actuator means, the improvement which comprises: auxiliary control means including an actuator lever mounted for movement between a cocked and a restored position, means on said actuator lever for operating said actuator means in movement of the lever from said cocked position to said restored position, a cocking lever mounted for movement by said record changer mechanism during the last half of a change cycle including means operative in said movement to move said actuator lever from said restored position to said cocked position, spring means connected to said actuator lever for tensioning with movement of the lever to its cocked position, latch means for latching said lever in its cocked position, and remotely controlled means operative to release said actuator lever to permit the energy stored in said spring means to move the actuator lever to the restored position.

9. In an automatic record changer having a record changer mechanism operable in a cyclic manner including actuator means for initiating a cycle of said record changer mechanism, and a manually operable control knob for selectively operating said actuator means, the improvement which comprises: auxiliary control means including an actuator lever mounted for movement between a cocked and a restored position, means on said actuator lever for operating said actuator means to initiate a cycle responsive to movement of the lever from said cocked position to said restored position, a cocking lever operable between a first and a second position including a first arm, means on said record changer for engaging said first arm to operate the cocking lever from said first position to said second position during each change cycle, a cocking arm on said cocking lever disposed to operate said actuator lever from said restored position to said cocked position responsive to said movement of the cocking lever, spring means connected to said actuator lever for tensioning with movement of the lever to its cocked position, latch means operative to latch said actuator lever in the cocked position, and remotely controlled means operative to release said latch to permit the energy stored in said spring means to move the actuator lever to the restored position.

10. In an automatic record changer having a record changer mechanism operable in a cyclic manner including actuator means for initiating a cycle of said record changer mechanism, and a manually operable control knob for selectively operating said actuator means, the improvement which comprises: auxiliary control means including an actuator lever mounted for movement between a cocked and a restored position, means on said actuator lever for operating said actuator means to initiate a cycle responsive to movement of the lever from said cocked position to said restored position, a cocking lever, means on said record changer for pivotally moving the cocking lever from a first position to a second position during each change cycle, cocking means on said cocking lever disposed to operate said actuator lever from said restored position to said cocked position responsive to said movement of the cocking lever, a latch member operative to latch said actuator lever in the cocked position, a common base plate affixed to said record changer for supporting said latch member and said actuator lever, a first spring means connected between said actuator lever and said base plate for tensioning with movement of the lever to its cocked position, a second spring means connected between said latch member and said base plate for tensioning said latch member against said actuator lever in its cocked position, and remotely controlled means operative to release said latch member to permit the energy stored in said first spring means to move the actuator lever to the restored position.

11. In an automatic record changer having a record changer mechanism operable in a cyclic manner including a main gear rotatable through one complete revolution in each cycle of the record changer mechanism, a pin eccentrically mounted on the main gear for rotation therewith, a slide assembly having a transverse drive slot therein for receiving the pin to effect longitudinal reciprocation of the slide assembly as a function of the angular displacement of said main gear during a change cycle, and control means including a reject rod and a control assembly for initiating rotation of said main gear to initiate a change cycle, the improvement which comprises: auxiliary control means including an actuator lever movable between a first and second position, a trip arm on said actuator lever located to operate said reject rod in its movement from the first to the second position and thereby initiate a cycle of said record changer, a cocking lever carried on said slide assembly and movable by said pin during each change cycle to move said actuator lever from the second position to the first position, spring means coupled to said actuator lever for tensioning with movement of the actuator lever from said second position to said first position, an electromagnet, latch means operative to hold the actuator lever in the first position as moved thereto and operatively controlled by said electromagnet to release said actuator lever for displacement by said spring means to the second position, and remotely-controlled means connected to selectively operate said electromagnet.

References Cited in the file of this patent

UNITED STATES PATENTS

| | | |
|---|---|---|
| 2,287,727 | Crammer | June 23, 1942 |
| 2,555,478 | Ende et al. | June 5, 1951 |
| 2,984,492 | Guest | May 16, 1961 |

Notice of Adverse Decision in Interference

In Interference No. 93,664 involving Patent No. 3,066,941, R. Van Antwerp, REMOTELY CONTROLLED RECORD CHANGER, final judgment adverse to the patentee was rendered Mar. 11, 1965, as to claim 2.

[*Official Gazette May 4, 1965.*]